Sept. 21, 1943.     A. L. LANGEL     2,329,772
BAKING PAN
Filed March 15, 1939     2 Sheets-Sheet 1

Inventor:
Adrien L. Langel,

Sept. 21, 1943. A. L. LANGEL 2,329,772
BAKING PAN
Filed March 15, 1939 2 Sheets-Sheet 2
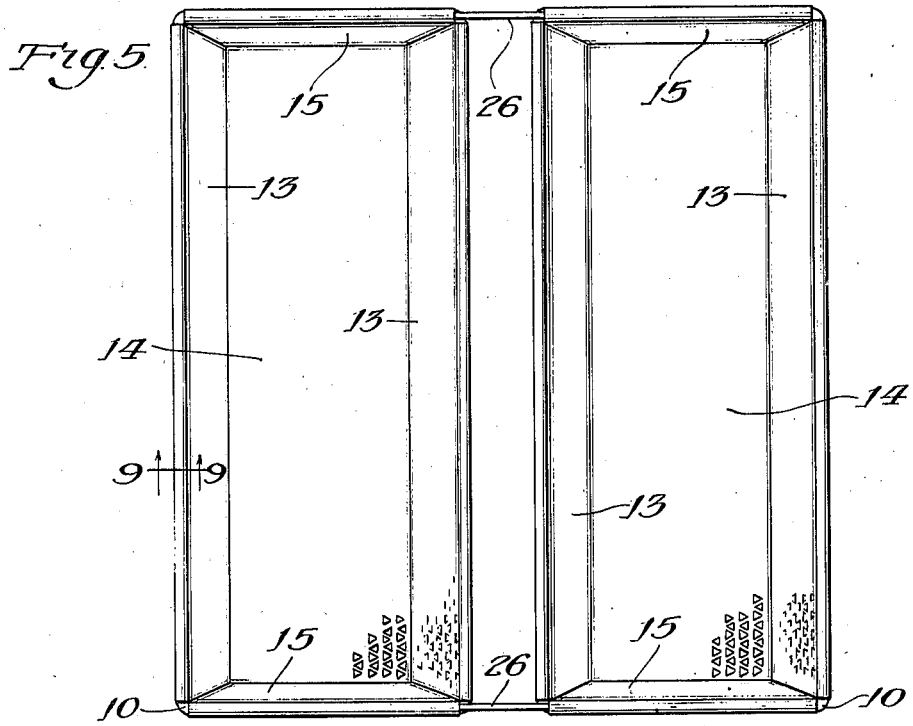
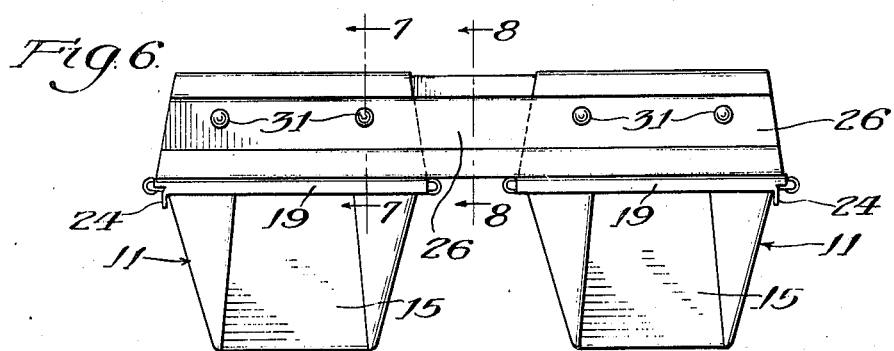
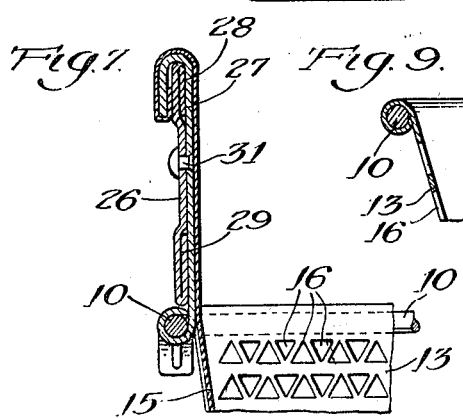
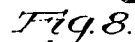
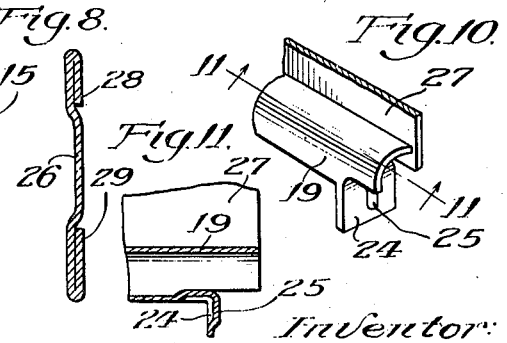
Inventor:
Adrien L. Langel.
By Zabel, Carlson, Gritz Laughlin Wiles
Attorneys Patented Sept. 21, 1943

2,329,772

UNITED STATES PATENT OFFICE 2,329,772

BAKING PAN

Adrien L. Langel, Chicago, Ill., assignor to Chicago Metallic Manufacturing Company, Chicago, Ill., a corporation of Illinois Application March 15, 1939, Serial No. 261,942

14 Claims. (Cl. 53—6)

This invention relates to baking pans and particularly to such pans which are adapted to be stacked to advantage in piles for storage, the invention being shown as applied to single pans and also to an improved multiple pan arrangement.

One of the objects of this invention is to provide a baking pan construction wherein each pan is provided with supports for a superposed pan, such supports being furnished by extensions of the pan wall thereby presenting an unbroken and hence readily cleaned surface to the contents of the pan.

Another object of this invention is to provide a baking pan having perforations in the sides and bottom thereof to adapt the pan to the open hearth process of baking.

These and other objects will become readily apparent as the description proceeds.

In its preferred form this invention comprises a reinforcing band or frame member to which the body of the pan is connected in the form of a receptacle bent up from sheet metal. The sides and bottom of the receptacle are perforated in a manner to give a maximum exposure of the contents to the action of hot gases without permitting any of said contents to escape. The sheet metal end portions of the receptacle are not secured to the frame, but are supported instead by upstanding plates, the bottoms of which rest upon the frame. Said ends pass along the inner surfaces of the plates and around the edges thereof and are preferably pinched against the plates by folding the edges of the plates upon themselves. The plates serve to prevent endwise movement of the pans relative to one another when they are stacked, and each pan is provided further with lugs engaging the next lower pan for preventing relative sidewise movement.

A multiple pan arrangement is made by riveting or otherwise securing the corresponding end plates of a plurality of pans to a transverse strap, the plates and end walls of the receptacle being folded over the strap in a novel manner to obtain a reinforced construction.

The preferred form is shown in the accompanying drawings which form a part of this specification and in which Fig. 1 is a plan view of a baking pan constructed in accordance with this invention;

Fig. 5 is a plan view of a multiple pan arrangement embodying my invention;

Fig. 6 is an end elevation of the pan of Fig. 5;

Fig. 7 is an enlarged vertical sectional view taken at the line 7—7 of Fig. 6;

Fig. 8 is an enlarged vertical sectional view taken at the line 8—8 of Fig. 6;

Fig. 9 is an enlarged vertical sectional view taken at the line 9—9 of Fig. 5;

Fig. 10 is an enlarged perspective of one of the supporting lugs; and

Fig. 11 is a section through the lug taken along line 11—11 of Fig. 10.

Figure 1:
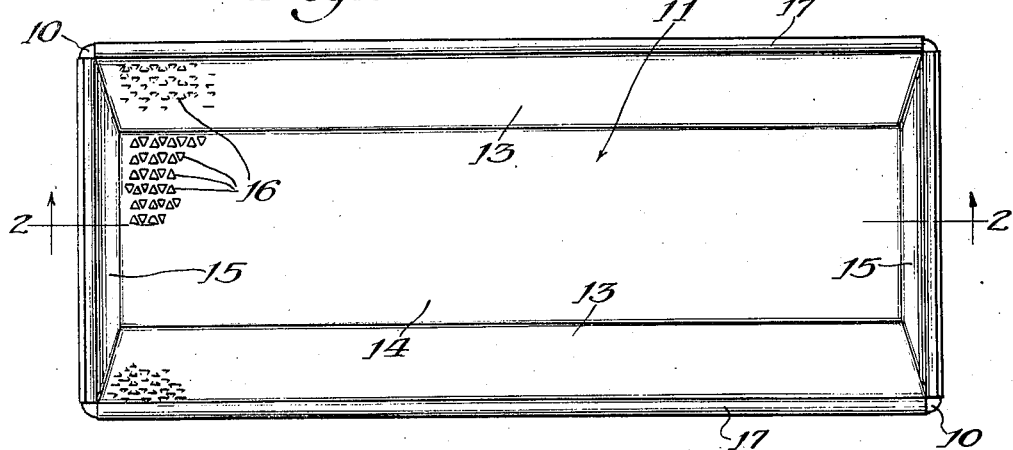
Figure 2:
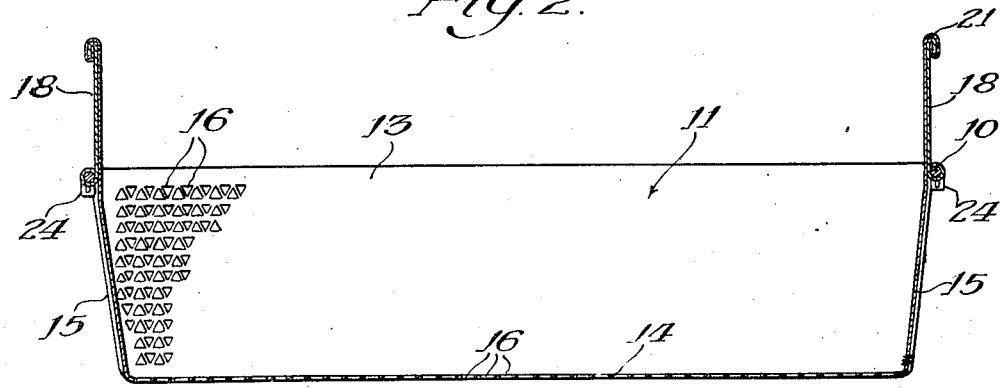
Fig. 2 is a longitudinal vertical sectional view taken substantially at the line 2—2 of Fig. 1.
Figure 3:
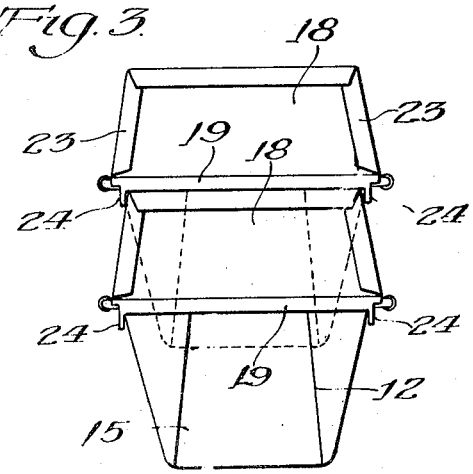
Fig. 3 shows the manner in which pans of the type shown in Figs. 1 and 2 can be stacked one upon the other.
Figure 4:
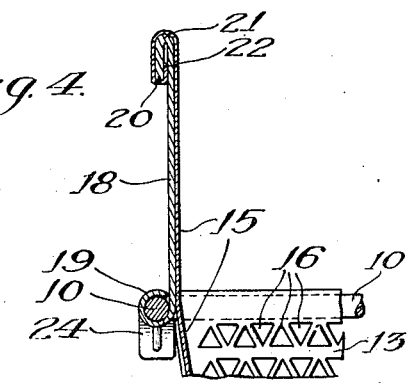
Fig. 4 is an enlarged view of the left hand portion of Fig. 2.

Referring now to Figs. 1 to 5 for a detailed description of the invention, 10 is a frame made of wire or from a rod of sufficient diameter to give it stiffness. Rigidly connected with the frame 10 is a receptacle or pan 11 which in the arrangement shown is made from a piece of sheet metal folded at the corners as at 12, to form the side walls 13, bottom 14, and end walls 15 of the receptacle.

The sheet is preferably perforated so that the pan may be used to bake bread, cake, or the like by the open hearth process. By this process the sides and bottom of the dough are exposed to the action of the hot gases as well as the top, thereby giving these portions of the bread, cake or the like the same appearance and flavor as the top. These perforations 16 according to this invention are triangular in form and are closely spaced in rows and cross rows. I have found that this type of perforation provides a maximum exposure to the hot gases as well as a maximum support for the dough. The size of the triangles will depend upon the consistency of the dough with which the pan is to be used.

The sides 13 are secured to the frame 10 by curling the edges 17 over and around the frame. The ends 15 of the pan are not so secured to the frame as will be presently explained.

Upon the end portions of frame 10 are mounted plates 18 (Fig. 4), the function of which is to support a second pan upon the first and to provide a comparatively high end wall for limiting the length of the loaf so as to insure the production of a loaf with end faces perpendicular to the body of the loaf for avoiding waste when sliced. Said plates 18 are generally trapezoidal in form, the long base of the trapezoid being curled under and around the end portions of the frame 10 as at 19. To maintain these end plates in an upstanding position relative to the frame, the curled portion 19 is spot welded at a number of accessible points to the frame 10.

The ends 15 of the pan are extended upwardly beyond the frame and along the inner surfaces of plates 18 in a smooth unbroken fashion and are carried over and around the upper edges 20 of the plates. To strengthen the upper edges 20, said edges are folded over as shown at 21, and in so folding, the edges 22 of the extended end walls 15 are pinched securely in place. Side edges 23 are similarly folded and are preferably so folded before top edges 20 are folded. This construction of plates 18 and end walls 15 results in a rigid support for a superposed pan with no interruptions in the surface of the receptacle.

The ends of the curled base 19 of each plate 18 are split and the lower portion thereof is then bent downward to form a lug 24. These lugs function to prevent sidewise movement of one pan relative to the other. The upstanding plates 18, of course, serve to prevent relative endwise movement between the pans.

Referring more particularly to Figs. 10 and 11, it will be observed that the lug 24 is formed by flattening the bottom portion of the curled edge 19. This portion is then stiffened by forming a bead 25 therein which extends for some distance parallel with the frame and then downward along the center of the lug.

It is readily apparent thus that a considerable number of pans made in accordance with this invention can be readily stacked one upon the other into a pile which does not shift as pans are added. The pile thus remains stable and balanced and the inner face of one pan is held out of contact with the next higher pan.

A modified form of construction is shown in Figs. 5 to 9, inclusive. In this modified form two or more pans of the type described are united side by side so as to be handled as a single unit. This is accomplished by the provision of a pair of straps 26 which are rigidly connected with the plates 27 of the individual pans, such plates 27 corresponding with the plates 18 of the pans shown in Figs. 1 to 4. As is shown in Fig. 8, the top and bottom edge portions of the plate 26 are folded to provide flanges 28 and 29 for reinforcing the structure, the flanges 28 and 29 in the arrangement shown being flush with the face of the intermediate portion of the plate.

As shown in Fig. 7, the upper edge portions of the plates 27 are interlocked with the upper edge portions of the end wall portions 15, the strap 26 being preferably secured to plates 27 by rivets 31. As is best shown in Fig. 7, the inner heads of the rivets 31 are flush with the inner surface of the plates 27, so that such rivets do not extend through the end walls 15 of the pans. The plates 27 are welded to the frames 10 to prevent turning movement of the plates. As is clearly shown in Fig. 6, the outer ends of the plates 27 are provided with lugs 24 for preventing sidewise movement of the pans relative to one another. In the arrangement shown, the inner ends of the plates 27 are not provided with lugs 24.

It is apparent that the pans shown are rugged but inexpensive to make. Since the lugs are integral with the supporting plates they do not come loose or get out of adjustment. The method of attachment of the plates to the frame makes possible a smooth inner surface for the pan which is highly desirable.

It is understood that the foregoing description is merely illustrative of a preferred embodiment of the invention and that the scope of the invention therefore is not to be limited thereto but is to be determined by the appended claims.

I claim:

1. A baking pan comprising a reinforcing member having oppositely disposed portions rigidly connected together, a sheet of metal folded to form the walls and bottom of the pan, and upstanding plates rigidly secured in position with their lower edges curled around opposed portions of said reinforcing member, said sheet having extensions passing upwardly along the inner faces of said plates with their upper edge portions curled about the upper edge of said plates.

2. A baking pan comprising a reinforcing rod bent into form to provide oppositely disposed portions rigidly connected together, a sheet of metal folded to form the walls and bottom of the pan, upstanding plates rigidly secured in position with their lower edges curled around opposed portions of the rod, and extensions on said sheet passing upwardly along the inner faces of said plates with the upper edge portions of the plates and extensions curled together in interlocking engagement with each other.

3. A baking pan comprising a reinforcing rod bent into the form of a closed figure, a sheet of metal folded to form the walls and bottom of the pan, said sheet being curled outwardly over opposed portions of the rod, upstanding plates curled around other opposed portions of the rod, and extensions on said sheet passing upwardly adjacent said plates and around the upper edges thereof, said upper edges of the plates being folded so as to pinch the edges of the extensions between their folds.

4. A baking pan comprising a rectangular reinforcing member having oppositely disposed portions rigidly connected together, a sheet of metal folded to form the walls and bottom of the pan, the side wall portions of said sheet being curled outwardly over said reinforcing member, and upstanding plates on the outer faces of the end wall portions of said sheet having their lower edge portions curled around opposed portions of said reinforcing member and rigidly connected therewith for preventing the plates from moving with respect to said reinforcing member.

5. A baking pan comprising a reinforcing member having oppositely disposed portions rigidly connected together, a sheet of metal folded to form the walls and bottom of the pan, said sheet being curled outwardly over a portion of said reinforcing member, upstanding plates curled over opposed portions of said reinforcing member, and depending lugs on said plates formed integrally with the curled portions of the plates and having stiffening beads therein.

6. A multiple pan arrangement comprising a plurality of pans each having a reinforcing member formed with oppositely disposed end and side portions rigidly connected together, and each formed from a sheet of metal folded to form the walls and bottom of each pan, with the side walls curled outwardly over the adjacent parts of the reinforcing member, upstanding plates curled around the end portions of the reinforcing member of each pan, and stiff straps at the ends of the pans secured rigidly to said plates for holding the pans in spaced parallel relation.

7. A multiple pan arrangement as described in claim 6, said plates being folded over the upper edge of the strap to reinforce said strap thereat.

8. A multiple pan arrangement as described in claim 6, said strap being folded at its lower edge to stiffen it thereat.

9. A multiple pan arrangement as described in claim 6, said plates being folded over the upper edge of the strap to reinforce said strap thereat and said strap being folded over at its upper edge at the portion between the spaced plates.

10. A multiple pan arrangement as described in claim 6, in which extensions are provided on said walls opposite said upstanding plates with their upper edges bent into interlocking engagement with said plates.

11. A multiple pan arrangement as described in claim 6, in which lugs are provided on said upstanding plates for holding the multiple pan arrangement in centered position with respect to a similar multiple pan arrangement stacked therewith.

12. A multiple pan arrangement as described in claim 6, in which lugs are formed integrally with the curled portions of said upstanding plates for holding the multiple pan arrangement in spaced relation to a similar multiple pan arrangement stacked therewith.

13. A multiple pan arrangement as described in claim 6, in which said upstanding plates are secured rigidly to said reinforcing member for preventing their movement out of supporting position.

14. A multiple pan arrangement comprising in combination a plurality of pans arranged side by side in spaced relation to each other, upstanding plates rigidly secured in position to form upward extensions at the ends of the pans with the end walls of the pans also extended upwardly at the inner faces of said upstanding plates in mutually reinforcing relation thereto, and straps extending across the ends of the pans and secured rigidly in position on the pans by securing devices passing through the straps and through the upstanding plates so as to leave the end walls intact.

ADRIEN L. LANGEL.